US 7,849,127 B2

(12) United States Patent
Lindem, III et al.

(10) Patent No.: US 7,849,127 B2
(45) Date of Patent: Dec. 7, 2010

(54) METHOD AND APPARATUS FOR A DISTRIBUTED CONTROL PLANE

(75) Inventors: Alfred C. Lindem, III, Cary, NC (US);
Anand Oswal, Sunnyvale, CA (US);
Sachin Desai, Cupertino, CA (US);
Chandru Sargor, Sunnyvale, CA (US);
Renhua Wen, San Ramon, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 194 days.

(21) Appl. No.: 12/192,566

(22) Filed: Aug. 15, 2008

(65) Prior Publication Data

US 2010/0042712 A1   Feb. 18, 2010

(51) Int. Cl.
*G06F 15/16* (2006.01)
*G06F 11/00* (2006.01)
(52) U.S. Cl. ...................... 709/201; 370/400
(58) Field of Classification Search .......... 709/201, 709/202, 223, 226, 238; 370/227, 229, 389, 370/400, 401
See application file for complete search history.

(56) References Cited

U.S. PATENT DOCUMENTS

| | | | |
|---|---|---|---|
| 6,983,294 B2 | 1/2006 | Jones | |
| 7,263,597 B2 | 8/2007 | Everdell | |
| 7,453,797 B2* | 11/2008 | Daval et al. | 370/218 |
| 7,471,676 B2* | 12/2008 | Wybenga et al. | 370/389 |
| 2003/0126195 A1 | 7/2003 | Reynolds et al. | |
| 2003/0128668 A1 | 7/2003 | Yavatkar et al. | |
| 2005/0108416 A1 | 5/2005 | Khosravi et al. | |
| 2006/0072480 A1 | 4/2006 | Deval et al. | |
| 2007/0211742 A1 | 9/2007 | Trisno et al. | |

OTHER PUBLICATIONS

Nguyen et al., "Toward a Distributed Control Plane Architecture for Next Generation Routers", Proceedings of the Fourth European Conference on Universal Multiservice Networks (ECUMN'07), IEEE 2007, 10 pages.

* cited by examiner

*Primary Examiner*—Yemane Mesfin
(74) *Attorney, Agent, or Firm*—Blakely Sokoloff Taylor & Zafman, LLP (57) ABSTRACT

A method and apparatus for a distributed control plane. In one embodiment of the invention, a primary control card distributes control plane process instances among one or more secondary cards, including a secondary control card and/or one or more Advanced Service Engine (ASE) cards. The primary control card associates particular control messages with particular control plane process instances. Upon a line card receiving a control message that is associated with a particular control plane instance, the line card forwards the control message directly to that particular control plane instance.

24 Claims, 8 Drawing Sheets

METHOD AND APPARATUS FOR A DISTRIBUTED CONTROL PLANE

BACKGROUND

1. Field

Embodiments of the invention relate to the field of networking; and more specifically, to distributing control processes of a network element.

2. Background

A network element (e.g., router, switch, bridge, combination router/switch/bridge, etc.) is a piece of networking equipment, including hardware and software that communicatively interconnects other equipment on the network (e.g., other network elements, computer end stations, etc.). Typical network elements include one or more controller cards (e.g., XCRP (Cross-Connect Route Processor) cards), one or more line cards, and one or more feature cards (e.g., ASE (Advanced Service Engine) cards, each interconnected via a high speed mesh. A typical network element is logically separated into a data plane (sometimes also referred to as a forwarding plane) and a control plane. In the case that the network element is a router, the control plane typically determines how data (e.g., packets) is routed (e.g., the next hop for the data and the outgoing port for that data), and the data plane forwards that data. In addition, the control plane establishes sessions and maintains those sessions (e.g., by processing control messages received by the data plane). For example, in the case where the network element is providing support for Mobile IP, the control plane establishes Mobile IP sessions and refreshes those established Mobile IP sessions (e.g., by processing binding update messages).

The control plane includes one or more processes and/or daemons communicating with each other, typically through Inter-Process Communication (IPC). IPC supports point-to-point bidirectional communication between processes, and each endpoint for IPC is uniquely identified and monitored by a master process (e.g., a process manager). In addition, the master process (e.g., the process manager) monitors all of the other processes in the control plane and data plane. In addition, the control plane includes one or more data structures related to the services it provides. For example, if the network element is a router or has routing capability, the control plane typically includes a Routing Information Base (RIB). In addition, the control plane typically includes security and/or authentication processes (e.g., Authentication, Authorization, and Accounting (AAA)).

Typical network element may provide for 1:1 redundancy for control plane processes. For example, many network elements support dual controller cards, where one controller card acts as the active controller and the other acts as a hot standby. The active controller synchronizes with the standby controller. The standby controller assumes the role of active controller if the active controller fails. Typically, when acting as a standby controller, the standby controller does not actively perform signaling or process control messages.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Some network elements are multiple services network elements that provide support for multiple networking functions (e.g., routing, bridging, switching, Layer 2 aggregation, and subscriber management or any combination of routing, bridging, switching, Layer 2 aggregation, and subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

Some network elements support the configuration of multiple contexts. As used herein, each context includes one or more instances of a virtual network element (e.g., a virtual router, virtual switch, or a virtual bridge). Each context typically shares system resources (e.g., memory, processing cycles, etc.) with other contexts configured on the network element, yet is independently administrable. For example, in the case of multiple virtual routers, each virtual router shares system resources but is separate from other virtual routers regarding its management domain, AAA (authentication, authorization, and accounting) name space, IP address, and routing database(es). Service and/or content providers may employ multiple contexts to provide direct network access for customers and/or provide different classes of services for customers. As another example, in the case of multiple virtual switches, each virtual switch shares system resources but each virtual switch maintains its own forwarding table, which, for example, may be used to map Media Access Control (MAC) addresses to virtual circuits.

A method and apparatus for a distributed control plane is described. In one embodiment of the invention, a primary control card distributes control plane process instances among one or more secondary cards, including a secondary control card and/or one or more Advanced Service Engine (ASE) cards. In another embodiment of the invention, the primary control card associates particular control messages with particular control plane process instances. Upon a line card receiving a control message that is associated with a particular control plane instance, the line card forwards the control message directly to that particular control plane instance.

Figure 1:
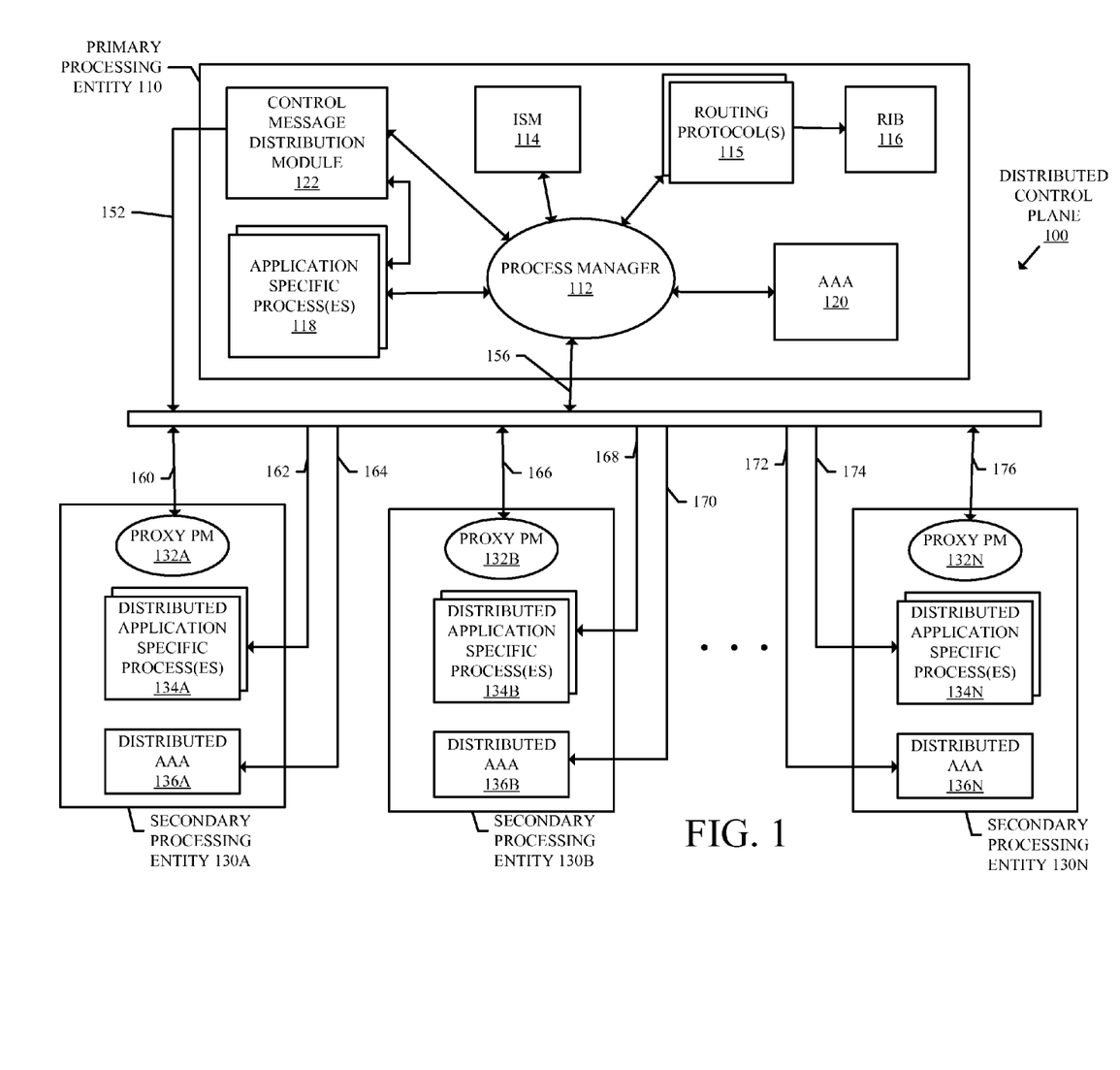
FIG. 1 illustrates an exemplary distributed control plane according to one embodiment of the invention.
Figure 8:
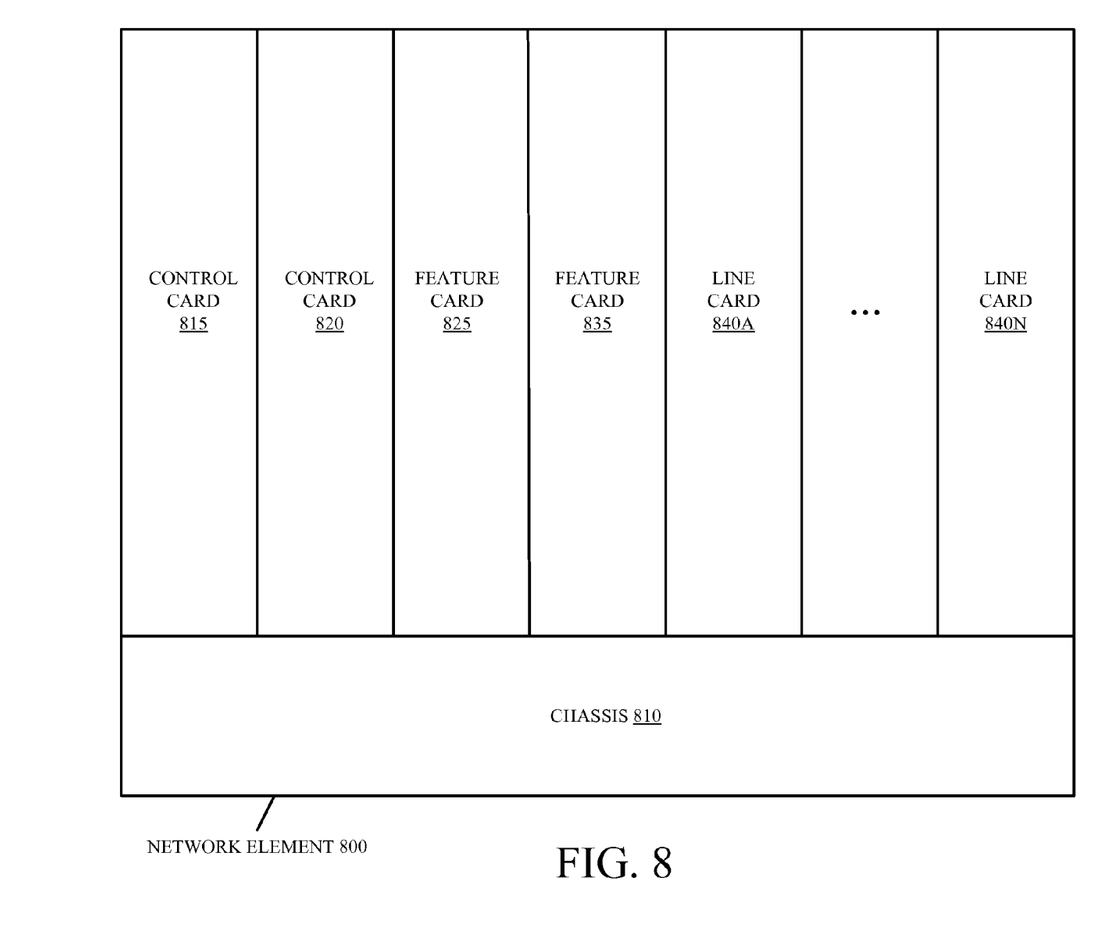
FIG. 8 is a block diagram exemplary illustrating an exemplary network element having a distributed control plane according to one embodiment of the invention.

FIG. 1 illustrates an exemplary distributed control plane according to one embodiment of the invention. According to one embodiment of the invention, the distributed control plane 100 illustrated in FIG. 1 is implemented with the exemplary architecture of the network element 800 illustrated in FIG. 8. However, it should be understood that the architecture illustrated in FIG. 8 is exemplary, and other alternative architectures may be used in alternative embodiments of the invention.

The distributed control plane 100 includes the primary processing entity 110 (e.g., a Cross-Connect Route Processor (XCRP) card) coupled with the secondary processing entities 130A-130N. As used herein, a processing entity performs control plane processing functions for the distributed control plane 100. According to one embodiment of the invention, processing entities include control cards (e.g., XCRP cards), Advanced Services Engine (ASE) cards (sometimes referred to as "feature cards"), line cards, and/or processor core(s) on the control cards, ASE cards, and/or line cards. Thus, while in one embodiment of the invention the distributed control plane 100 includes multiple cards (e.g., at least one control card and any combination of control cards, ASE cards, and line cards), in alternative embodiments of the invention the distributed control plane 100 is implemented within a single control card having multiple processor cores. ASE cards typically support processing of specific applications such as L4L7 services (firewall, IPSec, IDS, P2P), VoIP Session Border Controller, and Mobile Wireless Gateways (GGSN, Evolved Packet System (EPS) Gateway) etc. For example, an ASE card may be used to terminate IPsec tunnels and execute the attendant authentication and encryption algorithms. For example, with reference to FIG. 8, the control card 815 may be a primary processing entity and the control card 820 may be a secondary processing entity. In addition, the feature card 825 and the feature card 835 may each be each secondary processing entities. Also, in some embodiments of the invention, any or all of the line cards 840A-840N are secondary processing entities. It should also be understood that although the secondary processing entities 130A-130N illustrated in FIG. 1 each participate in the distributed control plane 100 (e.g., they each may host one or more distributed control plane process instances), other secondary processing entities (including control cards, ASE cards, line cards and/or processor cores on the control cards, ASE cards, and line cards), which are not illustrated in FIG. 1, may be included in the network element and may not participate in the distributed control plane 100.

Well known features of a network element are not illustrated in FIG. 1 in order not to confuse understanding of the invention. It should also be understood that the architecture illustrated in FIG. 1 is an example of an architecture of a distributed control plane, and other, alternative architectures may be used with the embodiments of the invention described herein.

The primary processing entity 110 executes several process instances and has access to several data structures. For example, the primary processing entity 110 executes the process manager 112, the Authentication, Authorization, and Accounting (AAA) process instance 120, one or more routing protocols 115 (e.g., BGP, IS-IS, OSPF, CSPF, Multicast protocols, RIP, etc.), the Routing Information Base (RIB) 116, the Interface State Manager (ISM) 114, the control message distribution module 122, and one or more application specific control plane processes 118. Of course, it should be understood that the process instances and the structures illustrated is illustrative and additional and/or other, alternative process instances and structures may be executed or accessible to the primary processing entity 110.

In one embodiment of the invention, the process manager 112 monitors and controls the operation of all of the processes running on the primary processing entity 110. For example, the process manager 112 initializes process instances and assigns each process instance a unique process instance identifier. The unique process instance identifier allows the same process to be instantiated multiple times on the same card (e.g., if the card supports SMP (Symmetric Multi-Processing) with multiple processor cores). As will be discussed in greater detail later herein, the unique process instance identifier is used in an IPC endpoint and/or shared memory segment. In addition, the process manager 112 assigns a unique process instance identifier to each distributed process instance.

The process manager 112 communicates with the process instances it is monitoring and controlling. For example, in one embodiment of the invention, the process manager 112 uses Inter-Process Communication (IPC) to communicate with the AAA 120, the one or more routing protocol modules 115, the ISM 114, the control message distribution module 122, and the one or more application specific control plane processes 118. The process manager 112 assigns a unique IPC endpoint to each of the processes on the primary processing entity 110 (thus, each process instance on the primary processing entity 110 has a unique IPC endpoint for IPC communication). According to one embodiment of the invention, the unique IPC endpoint includes the card slot number of the processing entity and the unique process instance identifier. In one embodiment of the invention, the process manager 112 monitors the status of process instances by transmitting and receiving IPC keepalive messages. For example, during normal operation, the process manager 112 transmits IPC keepalive messages periodically to the process instances (e.g., the one or more application specific processes 118) and receives IPC keepalive messages periodically from those process instances (e.g., from the one or more application specific control plane processes 118). If the process manager 112 does not receive a keepalive message from a particular process instance in a given time, the process manager 112 may take corrective action (e.g., restart the process instance, start a debugging process instance, etc.).

Thus, the process manager 112 monitors and controls the operation of the AAA 120, the one or more routing protocols 115, the ISM 114, the control message distribution module 122, and the one or more application specific control plane processes 118. In addition, in some embodiments of the invention, the process manager 112 manages and monitors the secondary processing entities (e.g., the secondary processing entities 130A-130N). For example, in one embodiment of the invention, the process manager 112 determines whether a secondary processing entity has been added to the network element (e.g., with reference to FIG. 8, the process manager determines whether another control card, feature card, or line card is added to the chassis 810).

Process instances are distributed across the secondary processing entities 130A-130N. For example, the secondary processing entities 130A-130N include a proxy process manager 132A-132N, one or more distributed application specific control plane processes 134A-134N, and a distributed AAA process instance 136A-136N respectively. In one embodiment of the invention, the process manager 112 distributes particular process instances to particular secondary processing entities 130A-130N. For example, the process manager 112 distributes the one or more distributed application specific control plane processes 134A-134N to the secondary processing entities 130A-130N respectively (designated by the lines 162, 168, and 174). The process manager 112 distributes the distributed AAA 136A-136N to the secondary processing entities 130A-130N respectively (designated by the lines 164, 170, and 172).

The distributed application specific control plane processes 134A-134N and the distributed AAA process instances 136A-136N are examples of distributed control plane process instances. It should be understood that in other embodiments of the invention, additional and/or different process instances and/or structures may be distributed to the secondary processing entities 130A-130N. For example, in some embodiments of the invention, the RIB 116 and/or the ISM 114 are distributed to one or more of the secondary processing entities 130A-130N. It should also be understood that certain control plane process instances may be distributed only to certain secondary processing entities. In other words, in some embodiments of the invention, a particular distributed control plane process instance does not have to be distributed across each of the secondary processing entities 130A-130N. In one embodiment of the invention, the distributed application specific control plane processes 134A-134N are processes related to Evolved Packet System (EPS) (a network architecture for 4G mobile telephone systems).

In addition, in some embodiments of the invention, the process manager 112 distributes a proxy process manager to each of the secondary processing entities that participate in the distributed control plane. For example, with reference to FIG. 1, the process manager 112 distributes the proxy process managers 132A-132N to the secondary processing entities 130A-130N respectively. In addition, according to one embodiment of the invention, the process manager 112 monitors the status of each of the distributed proxy process managers 132A-132N (e.g., in a similar manner as described above in reference to the local process instances on the primary processing entity 110).

According to one embodiment of the invention, each of the proxy process managers 132A-132N monitors and controls the operation of its local distributed process instances. For example, the proxy process managers 132A-132N monitor and control the operation of the one or more distributed application specific control plane processes 134A-134N and the distributed AAA processes 136A-136N respectively. According to one embodiment of the invention, the proxy process managers 132A-132N periodically transmit and receive IPC keepalive messages from their local distributed process instances. For example, the proxy process manager 132A on the secondary processing entity 130A periodically transmits and receives IPC keepalive messages from the one or more distributed application specific control plane processes 134A and the distributed AAA 136A. In one embodiment of the invention, if the proxy process manager does not receive a keepalive message from a particular process instance in a given amount of time, that proxy process manager may take corrective action. In another embodiment of the invention, the proxy process managers 132A-132N report a change of status of one of the process instances it is monitoring to the process manager 112. The process manager 112 may then take corrective action. Thus, in some embodiments of the invention, the process manager 112 on the primary processing entity 110 does not actively monitor the distributed process instances, with the exception of the proxy process managers.

Thus, since the proxy process managers 132A-132N each monitor their local distributed process instances, the process manager 112 on the primary processing entity 110 does not actively communicate with each distributed process instance. Thus, for example, the amount of messages through the mesh 150 is decreased with use of the proxy process managers 132A-132N. In addition, resources of the primary processing entity 110 are conserved (e.g., processing cycles and memory load) since the process manager 112 does not actively monitor each of the distributed process instances across multiple processing entities.

Figure 2:
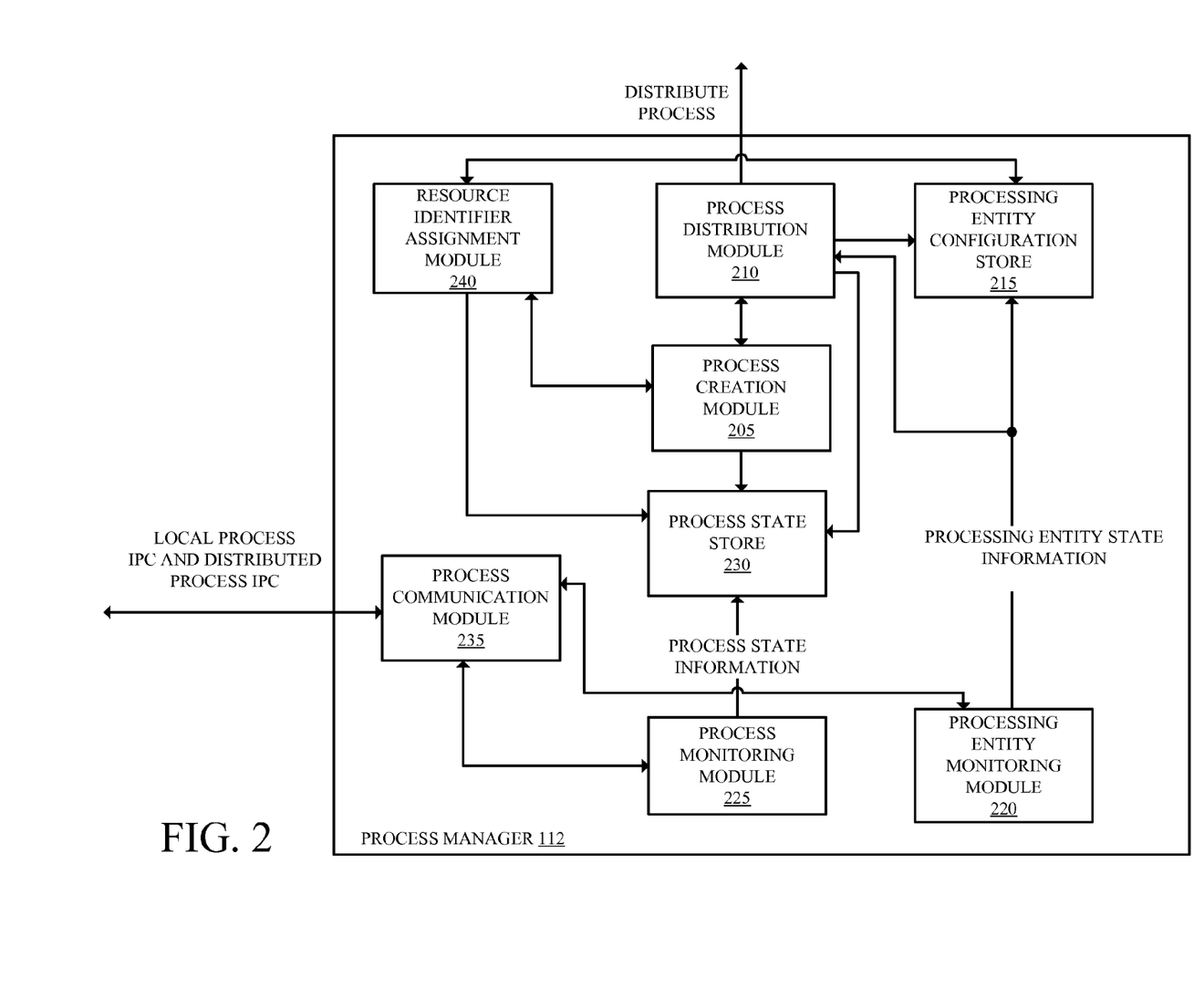
FIG. 2 illustrates an exemplary process manager according to one embodiment of the invention.

FIG. 2 illustrates an exemplary process manager according to one embodiment of the invention. It should be understood that the architecture illustrated in FIG. 2 is exemplary, and other alternative architectures may be used in alternative embodiments of the invention. FIG. 2 will be described with reference to the exemplary operations of FIG. 3. However, it should be understood that embodiments discussed with reference to FIG. 2 can be performed by operations different than those discussed with reference to FIG. 3, and the operations discussed with reference to FIG. 3 can be performed by embodiments different than those discussed with reference to FIG. 2. The process manager 112 illustrated in FIG. 2 includes the process creation module 205, the process distribution module 210, the process entity configuration store 215, the processing entity monitoring module 220, the process monitoring module 225, the process state store 230, the process communication module 235, and the IPC endpoint and shared memory assignment module 240. Each of these will be described in greater detail later herein.

Figure 3:
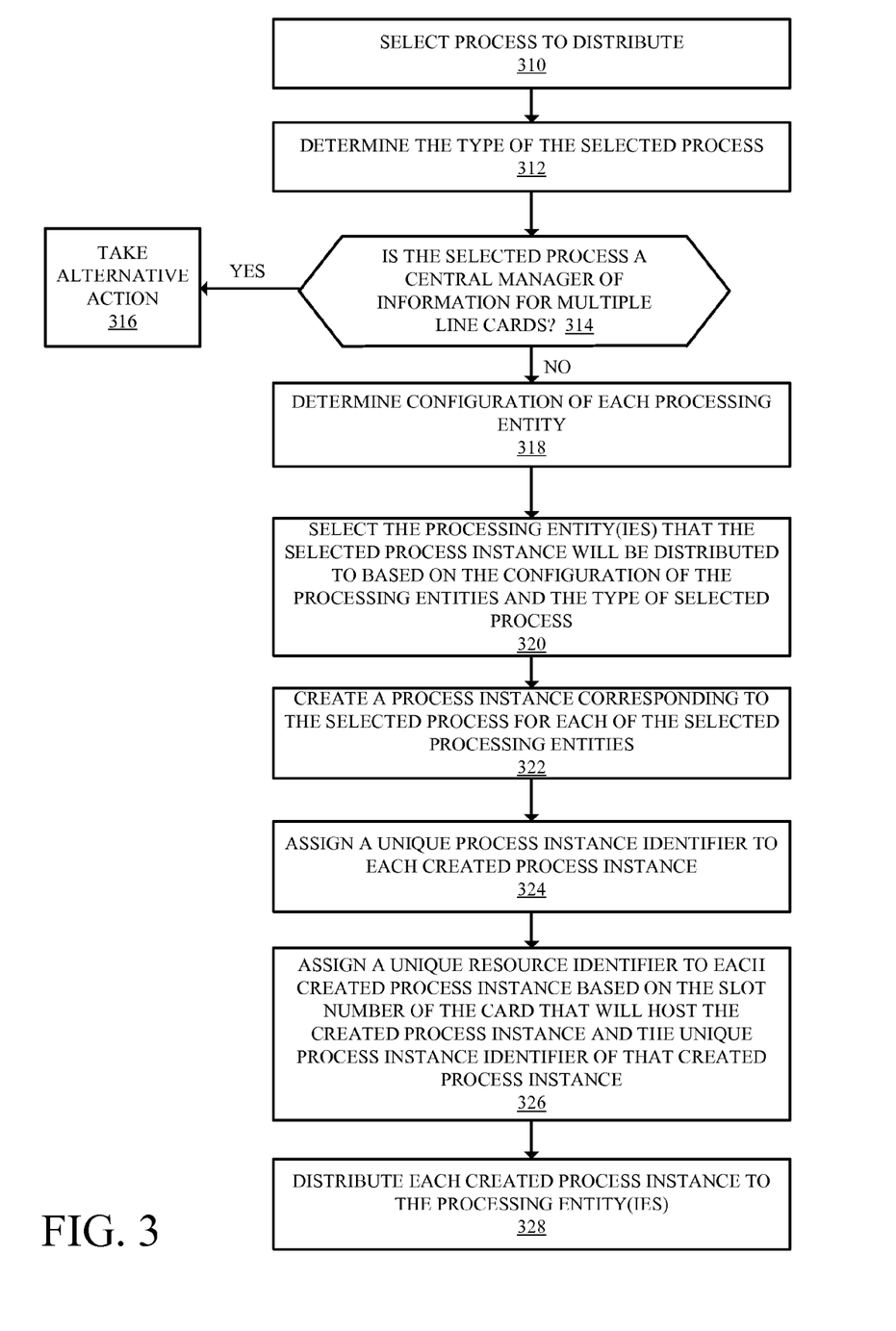
FIG. 3 is a flow diagram exemplary illustrating distributing control plane process instances to one or more secondary processing entities according to one embodiment of the invention.

FIG. 3 is a flow diagram exemplary illustrating distributing control plane process instances to one or more secondary processing entities according to one embodiment of the invention. According to one embodiment of the invention, the process manager 112 performs the operations illustrated in FIG. 3 when distributing the control plane process instances. At block 310, the process manager selects a control plane process for distribution, and flow moves to block 312. According to one embodiment of the invention, the process manager receives the selection from a network administrator selecting a control plane process to distribute. For example, the network administrator uses a command line interface to select a control plane process for distribution. With reference to FIG. 2, according to one embodiment of the invention, an indication of the selected process is stored in the process state store 230. According to one embodiment of the invention, the process state store 230 includes state information related to each of the processes running in the network element (including the processes running on the secondary processing entities). If an indication of the selected process is not in the process state store 230 (e.g., the selected process is not running in the network element), according to one embodiment of the invention the process is instantiated (e.g., created) by the process creation module 205 if the process is supported.

There are several factors to consider when determining which of the control plane processes to distribute to which of the one or more secondary processing entities. For example, one factor is whether the control plane process is a central manager of information for line cards installed in the network element. For example, each of the one or more routing protocol modules 115 is typically a central manager of information for the line cards (e.g., they populate the routing information base 116). As is known in the art, forwarding information bases (FIBs) in the line cards are populated from the information in the RIB. As another example, the ISM 114 is also a central manager of information. If the selected control plane process is a central manager of information, each client (e.g., the distributed control plane process instances) either reports change of state to all of the other clients or reports change of state to the central manager of information (which then optionally updates the clients). For example, if a routing protocol instance is distributed to one or more secondary processing entities, upon a change to the protocol instance's local RIB (e.g., a route was added, modified, deleted, etc.) that routing protocol instance communicates the change to the master RIB process. Thus, at block 312, the process manager 112 determines the type of selected control plane process, and flow moves to block 314.

At block 314, the process manager 112 determines whether the selected control plane process is a central manager of information for multiple line cards. For example, with reference to FIG. 2, in one embodiment of the invention the process distribution module 210 determines whether the selected control plane process is a central manager of information (e.g., by accessing the process state store 230). If the selected process is a central manager of information, then flow moves to block 316 where alternative action is taken. For example, in one embodiment of the invention, the process distribution module 210 configures a hierarchy (e.g., each distributed process instance reports change of state to a central process instance). In another embodiment of the invention, the process distribution module 210 configures each of the distributed process instances of the selected type to communicate state changes with each of the other process instances of that type). If the selected process is not a central manager of information, then flow moves to block 318 where the process manager 112 determines the configuration of each secondary processing entity participating in the distributed control plane. With reference to FIG. 2, the process distribution module 210 determines the configuration of the secondary processing entities with use of the processing entity configuration store 215. According to one embodiment of the invention, the processing entity configuration store 215 includes the characteristics and the current processing statistics of the secondary processing entities. It should be understood that the characteristics of the secondary processing entities may vary (e.g., different processing capability, different memory characteristics, etc.). In addition, it should be understood that the current statistics of the secondary processing entities may vary (e.g., the current processing load, memory load, etc.). Thus, certain ones of the secondary processing entities may be better suited for control plane process instance distribution than others.

In one embodiment of the invention, the processing entity configuration store 215 also includes a budget for control plane process instance processing for each of the secondary processing entities participating in the distributed control plane. It should be understood that different secondary processing entities may have a different budget. In addition, in some embodiments of the invention, the budget is application specific (thus certain applications may have a higher budget than other applications). For example, the budget for control plane process instances related to Evolved Packet System (EPS) may be different than the budget for other applications. If a secondary processing entity does not have available resources for control plane process instance processing (e.g., according to the budget), the selected control plane process instance is not distributed to that secondary processing entity. According to one embodiment of the invention, the budget is assigned by a network administrator (e.g., using a command line interface to assign a budget). In other embodiments of the invention, the available budget of each of the processing entities is configured into the system.

In one embodiment of the invention, control plane process instance(s) may be automatically distributed to processing entities that are added to the distributed control plane. Additionally, the operations performed when additional secondary processing entities are added to the distributed control plane may be configured and may be application specific. For example, the processing entity monitoring module 220 detects when a processing entity is added to the network element. The processing entity monitoring module 220 notifies the process distribution module 210 when a processing entity has been added to the network element (along with updating the processing entity configuration store 215). Upon receiving indication that a new processing entity has been added to the network element, the process distribution module 210 may automatically distribute the process instances related to a given application (e.g., the process instances related to EPS) to the newly added processing entity without any configuration by a system administrator (with the exception of installing the processing entity into the network element). As one example, if the EPS application is configured for the distributed control plane (i.e., the process instances related to the EPS application will be distributed across multiple processing entities), the EPS application may take advantage of all of the processing entities participating in the distributed control plane, including any processing entities that are added at a later time. Thus, if a processing entity is added, the control plane process instances related to EPS are automatically distributed to the newly added processing entity.

Sometime after the configuration of each secondary processing entity is determined, flow moves to block 320. At block 320, the process manager 112 selects one or more processing entities. According to one embodiment of the invention, the process manager 112 performs this selection based on the configuration of the one or more secondary processing entities and the type of selected process. With reference to FIG. 2, the process distribution module 210 selects the one or more processing entities that will host a distributed process instance of the selected process. Flow moves from block 320 to block 322. At block 322, the process manager 112 creates a process instance corresponding to the selected process for each of the selected processing entities. For example, with reference to FIG. 2, the process distribution module 210 notifies the process creation module 205 to create a process instance corresponding to the selected process for each of the selected processing entities. The process creation module 205 creates those process instance(s) and updates the process state store 230 to reflect the created process instance(s). Flow moves from block 322 to block 324.

At block 324, the process manager 112 assigns a unique process instance identifier to each created process instance. For example, with reference to FIG. 2, the process creation module 205 assigns a unique identifier to each created process instance and updates the process state store 230 to reflect the assignment of the unique identifier. While in one embodiment of the invention the identifier is unique throughout the network element, in alternative embodiments of the invention the identifier is unique to a given processing entity. Flow moves from block 324 to block 326, where the process manager 112 assigns a resource identifier to each created process instance uniquely identifying the resource that will execute the process instance. According to one embodiment of the invention, the process manager 112 assigns the resource identifier based on the slot number of the card of the process entity that will host the created process instance and the unique process instance identifier of that created process instance. The resource identifier will be used to derive a unique IPC endpoint and/or a shared memory segment identifier. With reference to FIG. 2, the process creation module 205 notifies the resource identifier assignment module 240 to assign a resource identifier (or multiple resource identifiers (e.g., if IPC and shared memory are being used)) to each created process instance. The resource identifier assignment module 240 accesses the processing entity configuration store 215 to determine the slot number of each particular card of the processing entity and assigns resource identifier(s) for each created process instance. The resource identifier assignment module 240 updates the entries for each created process instance in the process state store 230 to reflect the assigned resource identifier(s). Flow moves from block 326 to block 328, where the process manager 112 distributes each created process instance to the selected processing entities.

After the control plane process instances are distributed, the units of workload for those control plane process instances are distributed among the control plane process instances (both distributed and residing locally on the primary processing entity 110). For example, the unit of workload for a disturbed EPS application is a mobile subscriber. It should be understood that the EPS application includes multiple processes, including EPS control, DSMIP (Dual Stack Mobility IP), PMIP (Proxy Mobile IP), IKE (Internet Key Exchange), AAA, etc. According to one embodiment of the invention, the control message distribution module 122 distributes the units of workload among the control plane process instances. As illustrated in FIG. 1, the control message distribution module 122 distributes the units of workload among the distributed control plane process instances on the secondary processing entities 130A-130N via the line 152.

Figure 4:
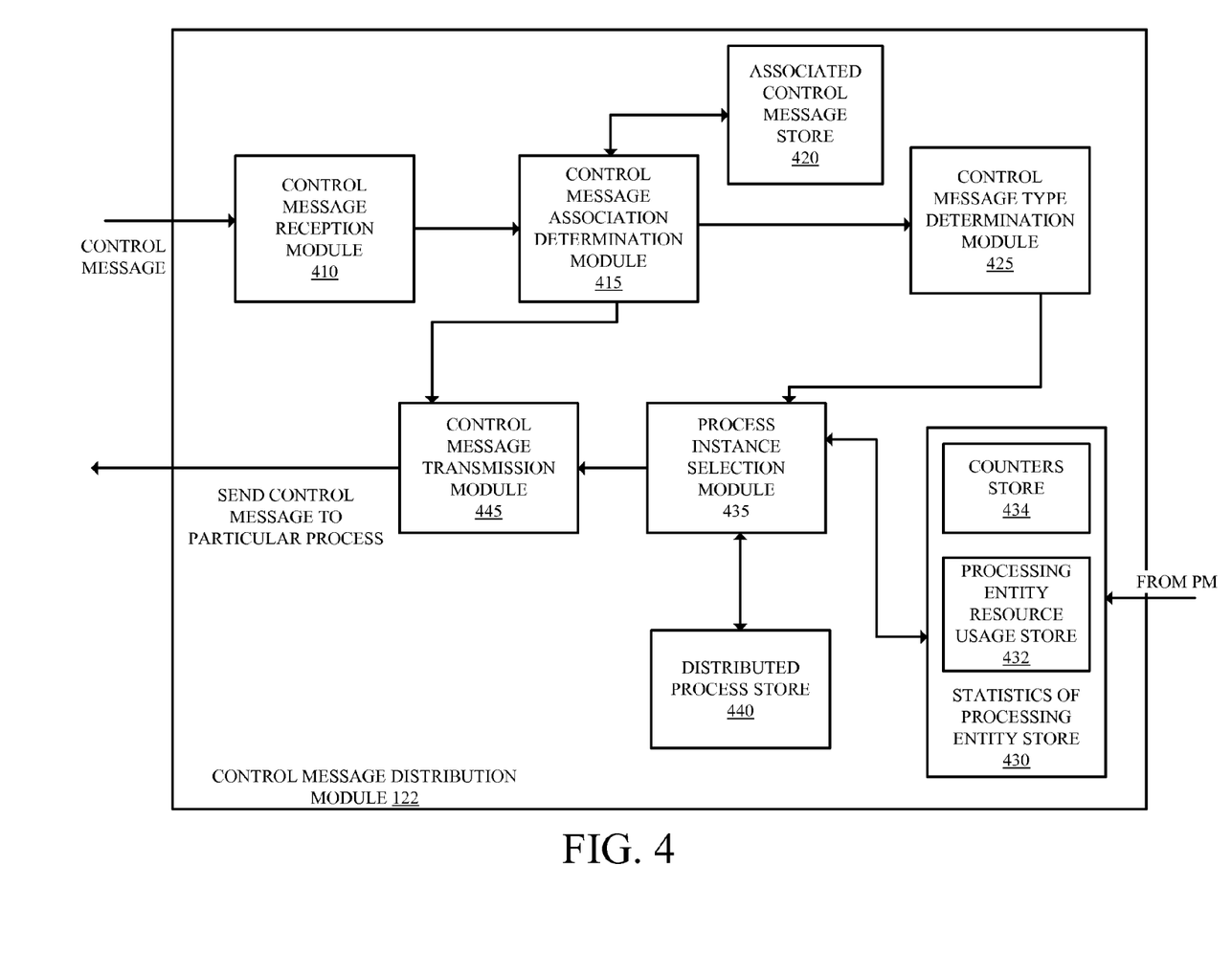
FIG. 4 illustrates an exemplary control message distribution module according to one embodiment of the invention.

FIG. 4 illustrates an exemplary control message distribution module according to one embodiment of the invention. The control message distribution module 122 illustrated in FIG. 4 includes the control message reception module 410, the control message association determination module 415, the associated control message store 420, the control message type determination module 425, the control message transmission module 445, the process instance selection module 435, the distributed process store 440, and the statistics of processing entity store 430. FIG. 4 will be described with reference to the exemplary operations of FIG. 5. However, it should be understood that embodiments discussed with reference to FIG. 4 can be performed by operations different than those discussed with reference to FIG. 5, and the operations discussed with reference to FIG. 5 can be performed by embodiments different than those discussed with reference to FIG. 4.

Figure 5:
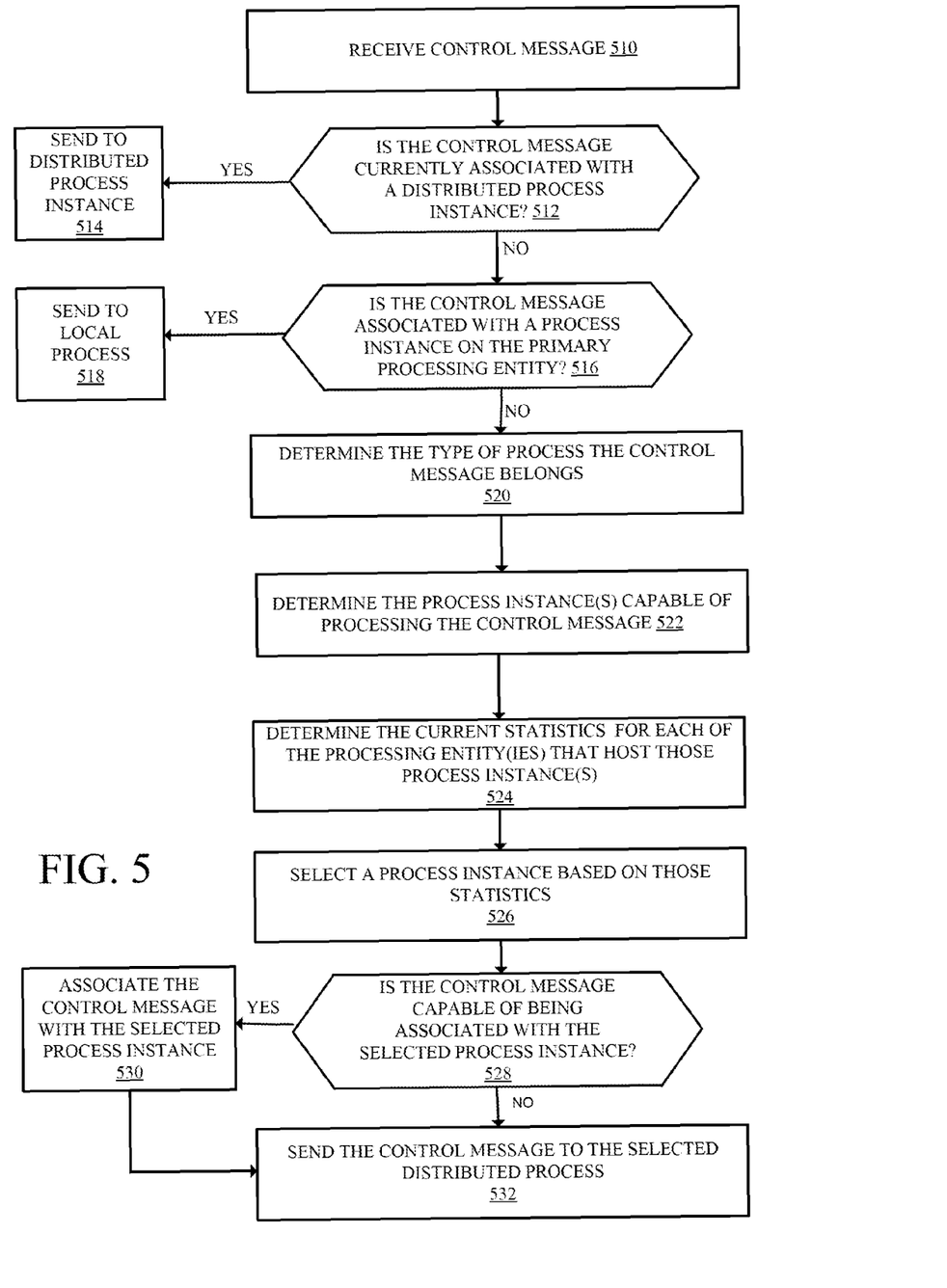
FIG. 5 is a flow diagram exemplary illustrating distributing control plane messages to control plane process instances according to one embodiment of the invention.
Figure 6:
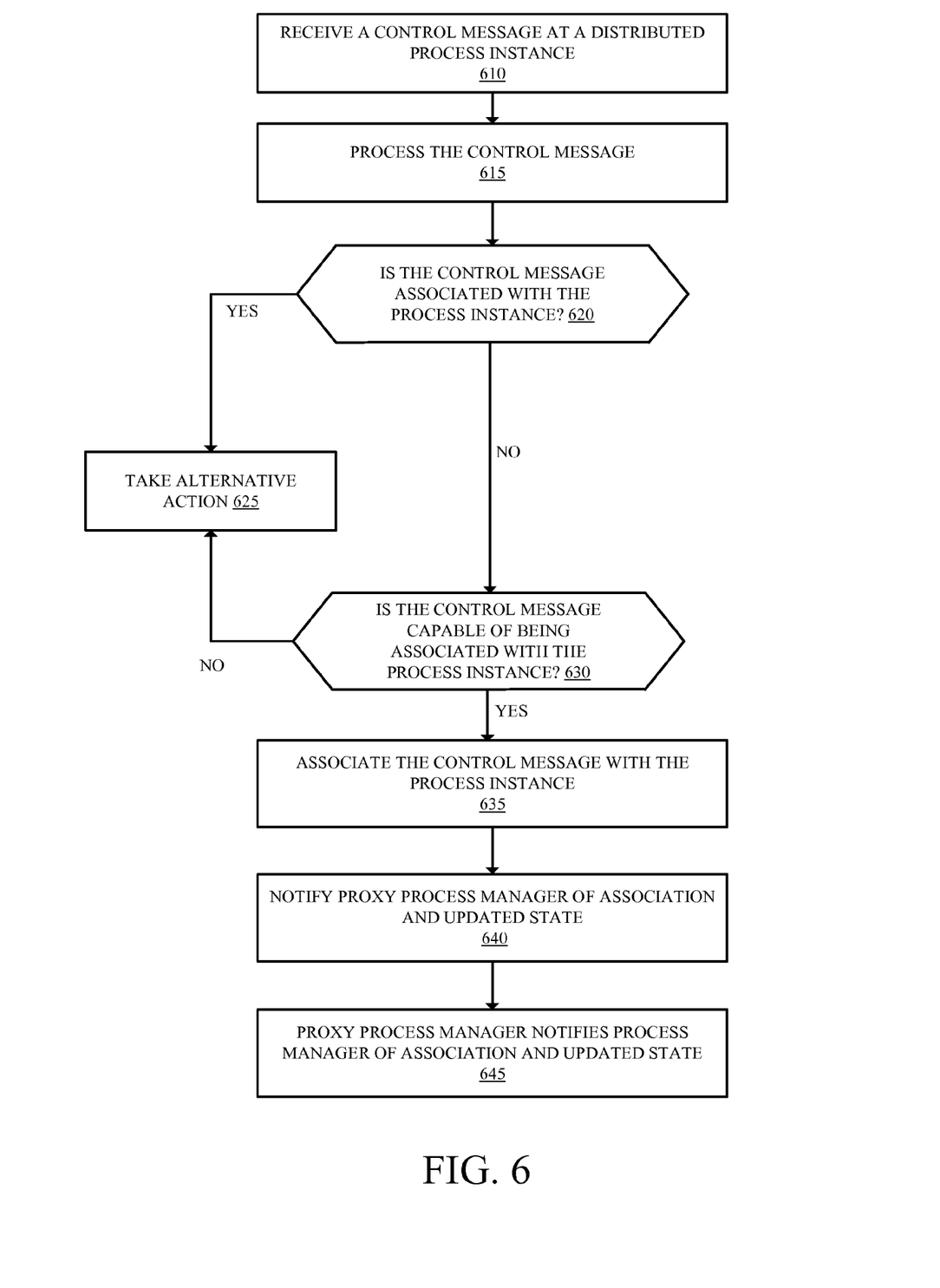
FIG. 6 is a flow diagram exemplary illustrating processing a distributed control message according to one embodiment of the invention.

At block 510, the control message distribution module 122 receives a control message related to a given application. For purposes of explanation, the control message referred throughout the description of FIGS. 5 and 6 is an EPS control message (e.g., a Mobile IP binding update message). With reference to FIG. 4, the control message reception module 410 receives the control message. It should be understood that in some embodiments of the invention the control message distribution module 122 does not receive the control message directly. For example, a line card on the network element receives the control message and forwards the message to the primary processing entity 110 upon determining that the message is a control message. The control message reception module 410 may cause the received control message to be stored in a memory that is accessible to the other modules of the control message distribution module 122. Flow moves from block 510 to block 512.

At block 512, the control message distribution module 122 determines if the received control message is associated with a distributed process instance. For example, with reference to FIG. 4, the control message reception module 410 notifies the control message association determination module 415 of a received control message. The control message association determination module 415 accesses the associated control message store 420 to determine whether the received control message is associated with a distributed process instance. For example, in one embodiment of the invention, the source address of the control message is used as an index into the associated control message store 420 to determine whether the source address is associated with a distributed process instance. If the control message is associated with a distributed process instance, then flow moves to block 514 where the control message is sent to that distributed process. For example, with reference to FIG. 4, the control message transmission module 445 transmits the control message to the associated distributed process. If the control message is not associated with a distributed process instance, then flow moves to block 516, where the control message distribution module 122 determines whether the control message is associated with a process instance on the primary processing entity 110. With reference to FIG. 4, the control message association determination module 415 determines, by accessing the associated control message store 420, whether the received control message is associated with a process instance on the primary processing entity 110. If the received message is associated with a process instance on the primary processing entity 110, flow moves to block 518 where the control message is sent to the associated process instance. However, if the received message is not associated with a process instance on the primary processing entity 110, then flow moves to block 520.

At block 520, the control message distribution module 122 determines the control message type of the received control message. The control message type determines which control plane process(es) are used to process the received control message. With reference to FIG. 4, the control message type determination module 425 determines the type of the received control message (e.g., by accessing a control message type store (not illustrated in FIG. 4 for simplicity purposes)). Flow moves from block 520 to block 522, where the control message distribution module 122 determines the process instance(s) capable of processing the control message. With reference to FIG. 4, the process instance selection module 435 determines the process instance(s) capable of processing the control message with use of the distributed process store 440. According to one embodiment of the invention, it is assumed that the primary processing entity 110 includes processes that can process the received control message. However, in an alternative embodiment of the invention, the primary processing entity 110 may not include the necessary processes to process the received control message. Flow moves from block 522 to block 524.

At block 524, for each of the process instance(s) determined as being capable of processing the received control message, the control message distribution module 122 determines the current statistics for the processing entity that hosts that process instance (e.g., through use of process instance selection module 435 and the statistics of processing entity store 430). With reference to FIG. 4, the statistics of processing entity store 430 include the counters store 434 and the processing entity resource usage store 432 (which are both typically populated by the process manager). Together, the counters and the processing entity resource usage information indicate how busy the processing entity is. The counters store 434 stores the number of control messages associated with a processing entity. For example, in reference to EPS, the counters store 434 stores the number of sessions associated with a processing entity. The processing entity resource usage store 432 stores the currently used amount of resources of each processing entity (e.g., processing cycles currently being used, memory usage, etc.). In one embodiment of the invention, the counters and resource usage information includes each of the secondary processing entities 130A-130N and the primary processing entity 110. Flow moves from block 524 to block 526.

At block 526, the control message distribution module 122 selects one of the available process(es) based on the those determined statistics (e.g., through use of the process instance selection module 435). For example, in some embodiments of the invention, the process instance selection module 435 applies a load balancing algorithm when selecting a process instance to process the control message (e.g., through use of the statistics of processing entity store 430). The statistics may be weighted differently in different embodiments of the invention. For example, in one embodiment of the invention, the counters information in the counters store 434 is given more weight than the processing entity resource usage information in the processing entity resource usage store 432. However, in another embodiment of the invention, the resource usage information has more weight than the counters information. According to one embodiment of the invention, the control message distribution module 112 selects the process which has the lowest counter value (e.g., in the case of EPS, the process with the lowest amount of sessions). In different embodiments of the invention, the control message distribution module 112 selects the process which is hosted by the processing entity with the highest amount of available resources. It should be understood that the control message distribution module 122 may select process instances hosted by the primary processing entity 110 or any of the secondary processing entities 130A-130N. After selecting a process instance the process, flow moves from block 526 to block 528.

At block 528, the control message distribution module 122 determines whether the control message is capable of being associated with the selected process instance. According to one embodiment of the invention, if the control message is associated with a selected process instance hosted on one of the secondary processing entities 130A-130N, the network element may directly forward that control message to the selected process instance without forwarding that control message to the primary processing entity 110. It should be understood that some control messages are capable of being associated with a selected process instance while other control messages cannot. If the control message cannot be associated with the selected process instance, then flow moves to block 532 where the control message is sent to the selected process instance for processing (e.g., through use of the control message transmission module 445).

If the control message can be associated with the selected process instance, then flow moves to block 530 where the control message is associated with the selected process instance. For example, in one embodiment of the invention, if the selected process instance has a separate network address (e.g., in the case of EPS, a separate layer 3 home address), that process instance can be associated with the control message (e.g., with the source address included in the control message). In this example, the association may be performed through protocol specific signaling. As another example, a new route may be added for locally terminated addresses for the control message. For example, in the case of EPS, the route may include the source address of the control message equaling the current care-of-address (CoA). As another example, if the control message is received on the data plane circuit associated with the source address of the control message, the association between the circuit and the home process instance may be used to route the control message directly to the home process instance. As another example, if a separate tunneling mechanism is used to process the control messages (e.g., in case of EPS, IPsec), that tunnel may be associated with the selected process instance. Flow moves from block 530 to block 532, where the control message distribution module 122 sends the control message to the selected distributed process instance.

FIG. 6 is a flow diagram exemplary illustrating processing a distributed control message according to one embodiment of the invention. According to one embodiment of the invention, the operations illustrated in FIG. 6 are performed by a secondary processing entity (e.g., one of the secondary processing entities 130A-130N). At block 610, a distributed control plane process instance receives a control message, and flow moves to block 615. Thus, one of the distributed control plane process instances receives the control message. The control message may have been sent by the control message distribution module 122 or, if the distributed control plane process instance is associated with the control message, the control message may have been directly sent to the selected distributed process.

At block 615, the selected process instance processes the control message. It should be understood that processing the control message may include different functions depending on the type of control message. For example, in the case of EPS, processing a control message may include creating a session, updating a session, removing a session, etc. In the case of a routing protocol, processing a control message may include creating a route, updating a route, deleting a route, etc. In addition, processing the control message may include updating state. Flow moves from block 615 to block 620.

At block 620, a determination is made whether the control message is associated with the process. For example, in one embodiment of the invention, each secondary processing entity participating in the distributed control plane includes an associated control message store similar to that stored in the primary processing entity 110. The process instance may access the local associated control message store to determine if it is associated with the control message. If the process instance is associated with the control message, then flow moves to block 625 where alternative action is taken. However, if the process instance is not associated with the control message (e.g., if the control message was the initial control message), then flow moves to block 630. At block 630, a determination is made whether the control message is capable of being associated with the process instance. If the control message cannot be associated with the process instance, then flow moves to block 625 where alternative action is taken. However, if the control message can be associated with the process instance, then flow moves to block 635.

At block 635, the control message is associated with the process instance. For example, in a similar fashion as described with reference to block 530, the control message is associated with the process instance. Flow moves from block 635 to block 640. At block 640, the process instance notifies its locally coupled proxy process manager of the association and any updated state information. For example, with reference to FIG. 1, if one of the distributed application specific control plane process instance(s) 134A processed the control message, that process instance notifies the proxy process manager 132A of any updated association and/or updated state information. Flow moves to block 645 where the proxy process manager notifies the process manager of any updated association and/or updated state information.

Figure 7:
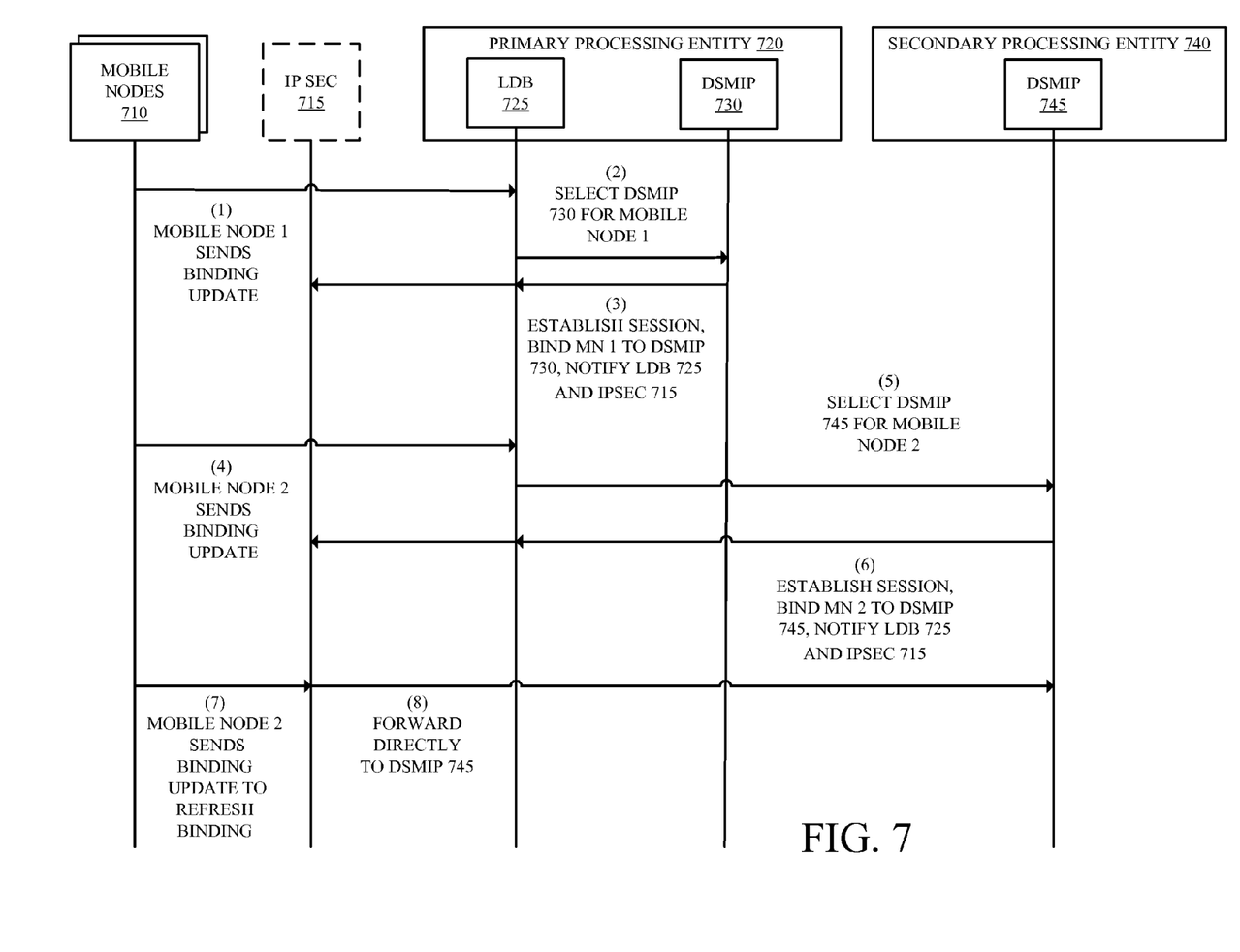
FIG. 7 is a data flow diagram exemplary illustrating processing control messages for Mobile IP sessions in a distributed control plane according to one embodiment of the invention.

FIG. 7 is a data flow diagram exemplary illustrating processing control messages for Mobile IP sessions in a distributed control plane according to one embodiment of the invention. FIG. 7 includes the mobile nodes 710 (e.g., computer end stations configured for Mobile IP) and the distributed control plane 705. The distributed control plane 705 includes the IPsec 715, the primary processing entity 720, and the secondary processing entity 740. According to one embodiment of the invention, the IPsec 715 is a bump-in-the-stack. For example, the IPsec 715 exists between the data link layer (layer 2) and the network layer (layer 3). IPsec 715 intercepts frames, performs security operations, and passes them to the network layer. In addition the IPsec 715 acts as a tunneling mechanism. In one embodiment of the invention, the IPsec 715 exists within the data plane (e.g., the encapsulation/decapsulation and other IPsec algorithms exist in the data plane while IKEv2 message exchanging are part of the control plane). It should be understood that although the distributed control plane 705 includes two processing entities (e.g., the primary processing entity 720 and the secondary processing entity 740), additional processing entities may be part of the distributed control plane 705. The primary processing entity 720 includes the control message distribution module 725 and the Mobile IP (MIP) 730 The secondary processing entity includes the MIP 745. Thus, the MIP 745 control plane process instances has been distributed to the secondary processing entity 740.

At operation 1, the primary processing entity 720 (e.g., the control message distribution module 725) receives a binding update control message from a first one of the mobile nodes 710. For this example, it is assumed that the first mobile node does not have a Mobile IP session created. Thus, the binding update control message sent by the first mobile node is the initial binding update control message. At operation 2, the control message distribution module 725 selects and forwards the control message to the MIP process instance 730 on the primary processing entity 720.

Sometime later, at operation 3, the MIP process instance 730 processes the control message. According to one embodiment of the invention, processing the control message includes establishing a session for the first mobile node and associating the session for the first mobile node with the MIP process instance 730 (e.g., creating a Security Association (SA) for the first mobile node and associating the SA with the MIP process instance 730). In addition, the MIP process instance 730 notifies the control message distribution module 725 and the IPsec 715 of the association between the session for the first mobile node and the MIP process instance 730.

Sometime later, at operation 4, the primary processing entity 720 (e.g., the control message distribution module 725) receives a binding update control message from a second one of the mobile nodes 710. For this example, it is assumed that the second mobile node does not have a Mobile IP session created. Thus, the binding update control message sent by the second mobile node is the initial binding update control message. At operation 5, the control message distribution module 725 selects and forwards the control message to the MIP process instance 745 on the secondary processing entity 740.

Sometime later, at operation 5, the MIP process instance 745 processes the control message. According to one embodiment of the invention, processing the control message includes establishing a session for the second mobile node and associating the session for the second mobile node with the MIP process instance 745 (e.g., creating a Security Association (SA) for the second mobile node and associating the SA with the MIP process instance 745). In addition, the MIP process instance 745 notifies the control message distribution module 725 and the IPsec 715 of the association between the session for the second mobile node and the MIP process instance 745

Sometime later, at operation 7, the IPsec 715 intercepts a binding update control message from the second mobile node (the binding update control message is to refresh the session). At operation 8, the IPsec 715 determines that the session for the second mobile node is associated with the MIP process instance 745 and thus directly forwards the control message directly to the MIP process instance 745 for processing. Thus, it should be understood that in some embodiments of the invention, control messages subsequent to the first control message are directly forwarded to the appropriate distributed process instance. For example, after a mobile node is associated with a particular process instance, the network element forwards control messages received from that mobile node directly to its associated process instance regardless if that process instance is executed by the primary processing entity or any of the secondary processing entity(ies).

FIG. 8 is a block diagram exemplary illustrating an exemplary network element having a distributed control plane according to one embodiment of the invention. The network element 800 includes the control cards 815 and 820, the feature cards 825 and 835, and the line cards 840A-840N, each coupled with the chassis 820. While in one embodiment of the invention the chassis 820 is coupled to the control cards 815 and 820, the feature cards 825 and 835, and the line cards 840A-840N, in alternative embodiments of the invention multiple other devices and/or modules are coupled to the chassis 820. While in one embodiment of the invention the distributed control plane includes the control cards 815 and 820, the feature cards 825 and 835, and the line cards 840A-840N, alternative embodiments of the invention may have alternate card arrangements (e.g., a combined line and control card with one or more ports and a forwarding engine, one control card per line card, multiple feature cards per line cards, etc.).

Unlike typical control planes which are not distributed, embodiments of the invention improve scalability for processing control plane messages. In addition, embodiments of the invention leverage existing processing cards to perform control plane message processing. For example, control cards, ASE cards, and/or line cards may each participate in the distributed control plane as described. It should be understood that line cards typically have not performed control plane message processing. Thus, the distributed control plane described herein allows a single network element to, e.g., in the case of EPS, support millions of mobile subscribers.

In an alternative embodiment of the invention, a system administrator selects a process to distribute and selects the processing entity(ies) the process will be distributed to. For example, the system administrator, with use of a command line interface or a graphical user interface, selects available processes to distribute to certain processing entity(ies). In addition, the system administrator may assign certain units of workload to certain distributed process instances on certain processing entity(ies). For example, certain processing entities may have more resources (e.g., processing capability, memory size, etc.) than other processing entities. The system administrator may select which processing entity(ies) suit a particular application. For example, in the case of EPS, the system administrator may choose to select processing entity(ies) which have the highest relative amount of resources.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a distributed control plane in a network element that includes a primary processing entity and one or more secondary processing entities, wherein the primary processing entity includes a plurality of control plane processes, comprising:

determining to distribute a set of one or more of the plurality of control plane processes to the one or more secondary processing entities;

for each control plane process to be distributed, performing the following:

assigning a unique process instance identifier to each control plane process instance to be distributed, and         assigning a unique resource identifier based on secondary processing entity identification and the unique process instance identifier;

distributing those control plane process instances to the one or more secondary processing entities;

receiving a first control plane process message, wherein the first control plane process message includes a control plane process message identifier; and     upon determining that the first control plane process message is not associated with a specific control plane process instance, performing the following:

selecting one of the control plane process instances,         forwarding the first control plane process message to that control plane process instance, and         processing the first control plane process message at that control plane process instance.

2. The method of claim 1, further comprising:

associating the control plane process message identifier with the selected control plane process instance;

receiving a second control plane process message, the second control plane process message including the control plane process message identifier;

forwarding the second control plane process message to the control plane process instance associated with the control plane process message identifier; and     processing the second control plane process message at that control plane process instance.

3. The method of claim 1, wherein determining to distribute a set of one or more of the plurality of control plane processes to the one or more secondary processing entities comprises:

for each of the plurality of control plane processes, determining whether it is a central manager of information;

if the control plane process is not a central manager of information, determining the amount of processing resources available on each secondary processing entity, wherein each secondary processing entity includes an available budget for distributed control plane process instances; and     selecting one or more of those secondary processing entities for control plane process distribution based on the amount of processing resources and current configuration.

4. The method of claim 1, wherein the primary processing entity further includes a process manager, and further comprising distributing a proxy process manager to each of the participating secondary processing entities, wherein each proxy process manager manages its local distributed control plane process instances and reports status of those control plane process instances to the process manager.

5. The method of claim 1, wherein the processes distributed support Evolved Packet System (EPS).

6. The method of claim 1, wherein the unique resource identifier is a Inter-Process Communication (IPC) endpoint name.

7. The method of claim 1, wherein the secondary processing entities include a secondary control card and one or more Advanced Service Engine (ASE) cards.

8. The method of claim 7, wherein the primary processing entity and at least one of the secondary processing entities include multiple processor cores, and further comprising distributing processes to the multiple processor cores.

9. A network element including a distributed control plane, the distributed control plane comprising:
    a hardware primary processing entity to include a plurality of control plane process instances, a process manager, and a control message distribution module,
        the process manager to selectively distribute a set of one or more of the plurality of control plane process instances to at least some of one or more hardware secondary processing entities, and
        the control message distribution module to receive control messages that are not assigned to any of the control plane process instances on the hardware primary processing entity or the one or more hardware secondary processing entities, for each control message received, the control message distribution module to select one of the control plane process instances and forward that control message to the selected control plane process instance; and
    the one or more hardware secondary processing entities to host the selectively distributed control plane process instances and to process received control messages.

10. The network element of claim 9, further comprising the process manager to assign a unique process instance identifier to each control plane process instance to be distributed, and the process manager to assign a unique resource identifier to each control plane process instance to be distributed based on the identification of the particular hardware secondary processing entity that the control plane process instance is to be distributed to and the unique process instance identifier of that control plane process instance.

11. The network element of claim 9, wherein the selectively distribute includes the process manager to, for each of the plurality of control plane process instances, determine the amount of processing resources available on each of the one or more hardware secondary processing entities, wherein each hardware secondary processing entity includes an available budget for distributed control plane process instances, and select one of those hardware secondary processing entities based on the amount of processing resources available.

12. The network element of claim 9, wherein the hardware secondary processing entities include a one or more control cards and one or more Advanced Service Engine (ASE) cards.

13. The network element of claim 9, further comprising the process manager to distribute a proxy process manager to each of the one or more hardware secondary processing entities, each proxy process manager to monitor the status of the distributed control plane process instances on the corresponding hardware secondary processing entity.

14. The network element of claim 9, further comprising the control message distribution module to associate control plane process message identifiers with selected control plane process instances.

15. The network element of claim 13, further comprising the process manager to monitor the status of the proxy process managers on the one or more hardware secondary processing entities.

16. The network element of claim 14, further comprising one or more line cards to receive control messages, wherein if a control message is received that is associated with a particular control plane process instance, the line card to forward that control message to that control plane process instance.

17. A non-transitory machine-readable storage medium that provides instructions that, if executed by a processor, will cause said processor to perform operations for a distributed control plane in a network element that includes a primary processing entity and one or more secondary processing entities, wherein the primary processing entity includes a plurality of control plane processes, comprising:
    determining to distribute a set of one or more of the plurality of control plane processes to the one or more secondary processing entities;
    for each control plane process to be distributed, performing the following:
        assigning a unique process instance identifier to each control plane process instance to be distributed, and
        assigning a unique resource identifier based on secondary processing entity identification and the unique process instance identifier;
    distributing those control plane process instances to the one or more secondary processing entities;
    receiving a first control plane process message, wherein the first control plane process message includes a control plane process message identifier; and
    upon determining that the first control plane process message is not associated with a specific control plane process instance, performing the following:
        selecting one of the control plane process instances,
        forwarding the first control plane process message to that control plane process instance, and
        processing the first control plane process message at that control plane process instance.

18. The non-transitory machine-readable storage medium of claim 17, further comprising:
    associating the control plane process message identifier with the selected control plane process instance;
    receiving a second control plane process message, the second control plane process message including the control plane process message identifier;
    forwarding the second control plane process message to the control plane process instance associated with the control plane process message identifier; and
    processing the second control plane process message at that control plane process instance.

19. The non-transitory machine-readable storage medium of claim 17, wherein determining to distribute a set of one or more of the plurality of control plane processes to the one or more secondary processing entities comprises:
    for each of the plurality of control plane processes, determining whether it is a central manager of information;
    if the control plane process is not a central manager of information, determining the amount of processing resources available on each secondary processing entity, wherein each secondary processing entity includes an available budget for distributed control plane process instances; and
    selecting one or more of those secondary processing entities for control plane process distribution based on the amount of processing resources and current configuration.

20. The non-transitory machine-readable storage medium of claim 17, wherein the primary processing entity further includes a process manager, and further comprising distributing a proxy process manager to each of the participating secondary processing entities, wherein each proxy process manager manages its local distributed control plane process instances and reports status of those control plane process instances to the process manager.

21. The non-transitory machine-readable storage medium of claim 17, wherein the processes distributed support Evolved Packet System (EPS).

22. The non-transitory machine-readable storage medium of claim 17, wherein the unique resource identifier is a Inter-Process Communication (IPC) endpoint name.

23. The non-transitory machine-readable storage medium of claim 17, wherein the secondary processing entities include a secondary control card and one or more Advanced Service Engine (ASE) cards.

24. The non-transitory machine-readable storage medium of claim 23, wherein the primary processing entity and at least one of the secondary processing entities include multiple processor cores, and further comprising distributing processes to the multiple processor cores.

* * * * *